(12) United States Patent
Sim et al.

(10) Patent No.: US 11,704,552 B2
(45) Date of Patent: Jul. 18, 2023

(54) TASK DETECTION IN COMMUNICATIONS USING DOMAIN ADAPTATION

(71) Applicant: Microsoft Technology Licensing, LLC, Redmond, WA (US)

(72) Inventors: Robert A Sim, Bellevue, WA (US); Ryen W. White, Redmond, WA (US); Hosein Azarbonyad, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1245 days.

(21) Appl. No.: 16/173,987

(22) Filed: Oct. 29, 2018

(65) Prior Publication Data
US 2020/0134442 A1    Apr. 30, 2020

(51) Int. Cl.
*G06N 3/08* (2023.01)
*H04L 51/224* (2022.01)

(52) U.S. Cl.
CPC .......... *G06N 3/08* (2013.01); *H04L 51/224* (2022.05)

(58) Field of Classification Search
None
See application file for complete search history.

(56) References Cited

U.S. PATENT DOCUMENTS

| | | | | |
|---|---|---|---|---|
| 2007/0192423 A1* | 8/2007 | Karlson | ............... | G06Q 10/109 715/764 |
| 2011/0239158 A1* | 9/2011 | Barraclough | ......... | G06F 3/0482 715/808 |
| 2012/0209863 A1* | 8/2012 | Hidesawa | ............. | G06F 16/332 707/755 |
| 2013/0007648 A1 | 1/2013 | Gamon et al. | | |
| 2013/0212197 A1* | 8/2013 | Karlson | ............... | H04L 51/046 709/206 |
| 2014/0172504 A1* | 6/2014 | Duva | ...................... | H04M 3/51 705/7.31 |
| 2015/0200895 A1* | 7/2015 | Ding | .................... | H04L 51/234 709/206 |

(Continued)

FOREIGN PATENT DOCUMENTS

WO    2017003977 A1    1/2017

OTHER PUBLICATIONS

Artstein, et al., "Inter-Coder Agreement for Computational Linguistics", In Journal of Computational Linguistics, vol. 34, Issue 4, Dec. 1, 2008, 53 Pages.

(Continued)

*Primary Examiner* — Toan H Vu
(74) *Attorney, Agent, or Firm* — Schwegman Lundberg & Woessner, P.A.

(57) ABSTRACT

Generally discussed herein are devices, systems, and methods for task classification. A method can include modifying a representation of a source sentence of a source sample from a source corpus to more closely resemble a representation of target sentences of target samples from a target corpus, operating, using a machine learning model trained using the modified representation of the source sentence, with the target sample to generate a task label, the task label indicating whether the target sample includes a task, and causing a personal information manager (PIM) to generate a reminder, based on whether the target sample includes the task.

20 Claims, 8 Drawing Sheets

(56) References Cited

U.S. PATENT DOCUMENTS

| | | | | |
|---|---|---|---|---|
| 2015/0302850 | A1* | 10/2015 | Lebrun | G06F 40/35 |
| | | | | 704/243 |
| 2016/0269334 | A1* | 9/2016 | Desouza Sana | H04L 51/18 |
| 2017/0161372 | A1 | 6/2017 | Fernandez et al. | |
| 2017/0319148 | A1* | 11/2017 | Shahin | A61B 5/02055 |
| 2018/0309708 | A1* | 10/2018 | Potvin | G06N 5/046 |
| 2018/0374171 | A1* | 12/2018 | Aizen | G06Q 50/167 |
| 2019/0129749 | A1* | 5/2019 | White | G06Q 10/109 |
| 2020/0104728 | A1* | 4/2020 | Lakshmanan | G06Q 10/107 |

OTHER PUBLICATIONS

Azarbonyad, et al., "Words are Malleable: Computing Semantic Shifts in Political and Media Discourse", In Proceedings of the 2017 ACM on Conference on Information and Knowledge Management, Nov. 6, 2017, pp. 1509-1518.

Bellotti, et al., "Taking Email to Task: The Design and Evaluation of a Task Management Centered Email Tool", In Proceedings of the SIGCHI Conference on Human Factors in Computing Systems, vol. 5, Issue 1, Apr. 5, 2003, pp. 345-352.

Benett, et al., "Detecting Action-items in e-Mail", Proceedings of the 28th Annual International ACM SIGIR Conference on Research and Development in Information Retrieval, Aug. 15, 2005, pp. 585-586.

Bengio, Yoshua, "Learning Deep Architectures for AI", In Journal of Foundations and Trends in Machine Learning, vol. 2, Issue 1, Nov. 15, 2009, 130 Pages.

Blitzer, et al., "Biographies, Bollywood, Boom-boxes and Blenders: Domain Adaptation for Sentiment Classification.", In Proceedings of the 45th Annual Meeting of the Association of Computational Linguistics, Jun. 2007, pp. 440-447.

Bousmalis, et al., "Domain Separation Networks", Retrieved from: «https://arxiv.org/pdf/1608.06019.pdf», Dec. 5, 2016, 15 Pages.

Chen, et al., "Marginalized Denoising Autoencoders for Domain Adaptation", In Proceedings of the 29th International Conference on Machine Learning, Jun. 18, 2012, 8 Pages.

Chen, et al., "Multinomial Adversarial Networks for Multi-Domain Text Classification", Retrieved from: «https://arxiv.org/pdf/1802.05694.pdf», Feb. 15, 2018, 15 Pages.

Cho, et al., "Learning Phrase Representations using RNN Encoder-Decoder for Statistical Machine Translation", Retrieved from: «https://arxiv.org/pdf/1406.1078.pdf», Sep. 3, 2014, 15 Pages.

Cohen, et al., Learning to Classify Email into "Speech Acts", In Proceedings of the Conference on Empirical Methods in Natural Language Processing, 2004, 8 Pages.

Dai, et al., "Boosting for Transfer Learning", In Proceedings of the 24th International Conference on Machine Learning, Jun. 20, 2007, pp. 193-200.

David, et al., "A Theory of Learning from Different Domains", In Proceedings of Machine Learning, vol. 79, Issue1-2, May 1, 2010, pp. 151-175.

Zhuang, et al., "Supervised Representation Learning: Transfer Learning with Deep Autoencoders.", In Proceedings of the 24th International Conference on Artificial Intelligence, Jul. 25, 2015, pp. 4119-4125.

Ganin, et al., "Domain-Adversarial Training of Neural Networks", In the Journal of Machine Learning Research, vol. 7, Issue 1, Jan. 1, 2016, 35 Pages.

Ganin, et al., "Unsupervised Domain Adaptation by Backpropagation", Retrieved from: «https://arxiv.org/pdf/1409.7495.pdf», Feb. 27, 2015, 11 Pages.

Glorot, et al., "Domain Adaptation for Large-Scale Sentiment Classification: A Deep Learning Approach", In Proceedings of the 28th International Conference on Machine Learning, Jun. 28, 2011, 8 Pages.

Gwizdka, Jacek, "Reinventing the Inbox: Supporting the Management of Pending Tasks in Email", In CHI'02 Extended Abstracts on Human Factors in Computing Systems, Apr. 20, 2002, pp. 550-551.

Hidetoshi, Shimodaira, "Improving Predictive Inference Under Covariate Shift by Weighting the Log-likelihood Function", In Proceedings of Journal of Statistical Planning and Inference, vol. 90, Issue 2, Oct. 1, 2000, pp. 227-244.

Hochreiter, et al., "Long Short-Term Memory", In Journal of Neural Computation, vol. 9, Issue 8, Nov. 15, 1997, pp. 1735-1780.

Jiang, et al., "Instance Weighting for Domain Adaptation in NLP", In Proceedings of the 45th Annual Meeting of the Association of Computational Linguistics, Jun. 2007, pp. 264-271.

Kalia, et al., "Monitoring Commitments in People-Driven Service Engagements", In Proceedings of IEEE International Conference on Services Computing (SCC), Jun. 28, 2013, 8 Pages.

Klimt, et al., "The Enron Corpus: A New Dataset for Email Classification Research", In Proceedings of the 15th European Conference on Machine Learning, Sep. 20, 2004, 11 Pages.

Kouw, "Feature-Level Domain Adaptation", In Proceedings of Journal of Machine Learning Research, Jan. 1, 2016, 32 Pages.

Lampert, et al., "Can Requests-for-Action and Commitments-to-Act be Reliably Identified in Email Messages", In Proceedings of the 12th Australasian Document Computing Symposium, Dec. 10, 2007, pp. 48-55.

Lampert, et al., "Detecting Emails Containing Requests for Action", In Proceedings of The Human Language Technologies: Conference of the North American Chapter of the Association of Computational Linguistics, Jun. 2, 2010, pp. 984-992.

Lampert, et al., "Requests and Commitments in Email are More Complex Than You Think: Eight Reasons to be Cautious", In Proceedings of the Australasian Language Technology Association Workshop, Dec. 8, 2008, 9 Pages.

Conneau et al., "Word Translation Without Parallel Data", Retrieved from: «https://arxiv.org/pdf/1710.04087.pdf», Jan. 30, 2018, 14 Pages.

Li, et al., "Transfer Learning for Collaborative Filtering via a Rating-Matrix Generative Model", In Proceedings of the 26th Annual International Conference on Machine Learning, Jun. 14, 2009, pp. 617-624.

Lin, et al., "Actionable Email Intent Modeling with Reparametrized RNNs", Retrieved from: <https://arxiv.org/pdf/1712.09185.pdf», Dec. 26, 2017, 9 Pages.

Liu, et al., "Adversarial Multi-task Learning for Text Classification", Retrieved from: «https://arxiv.org/pdf/1704.05742.pdf», Apr. 19, 2017, 10 Pages.

Mikolov, et al., "Distributed Representations of Words and Phrases and their Compositionality", In Proceedings of Advances in Neural Information Processing Systems, 2013, 9 Pages.

Mikolov, "Exploiting Similarities Among Languages for Machine Translation.", Retrieved from: «https://arxiv.org/pdf/1309.4168.pdf», Sep. 17, 2013, 10 Pages.

Nezhad, et al., "eAssistant: Cognitive Assistance for Identification and Auto-Triage of Actionable Conversations", In Proceedings of the 26th International Conference on World Wide Web Companion, Apr. 3, 2017, pp. 89-98.

Oard, et al., "Avocado Research Email Collection", In Proceedings of Linguistic Data Consortium, Feb. 16, 2015, 2 Pages.

Corston-Oliver, et al., "Task-focused Summarization of Email", In Proceedings of 42nd Annual Meeting of the Association for Computational Linguistics, Jul. 21, 2004, 8 Pages.

Pan, et al., "A Survey on Transfer Learning", Published in Journal of IEEE Transactions on Knowledge and Data Engineering, vol. 22, Issue 10, Oct. 1, 2010, pp. 1345-1359.

Quirk, et al., "MSR SPLAT, A Language Analysis Toolkit.", In Proceedings of NAACL HLT Demonstration Session., Jun. 3, 2012, pp. 21-24.

Raina, et al., "Constructing Informative Priors using Transfer Learning", In Proceedings of the 23rd International Conference on Machine Learning, Jun. 25, 2006, pp. 713-720.

Robbins, et al., "A Stochastic Approximation Method", In Journal of The Annals of Mathematical Statistics, vol. 22, Issue 3, Sep. 1951, pp. 400-407.

Sutskever, et al., "Sequence to Sequence Learning with Neural Networks", In Proceedings of Advances in Neural Information Processing Systems, Dec. 8, 2014, pp. 1601-1611.

(56) References Cited

OTHER PUBLICATIONS

Tur, et al., "The CALO Meeting Assistant System", In Proceedings of IEEE Transactions on Audio, Speech, and Language Processing, vol. 18., Aug. 6, 2010, 11 Pages.

Whittaker, et al., "Email Overload: Exploring Personal Information Management of Email", In Proceedings of the SIGCHI Conference on Human Factors in Computing Systems, Apr. 13, 1996, pp. 276-283.

Wu, et al., "Improving SVM Accuracy by Training on Auxiliary Data Sources", In Proceedings of the Twenty-first International Conference on Machine Learning, Jul. 4, 2004, 8 Pages.

Zhuang, "Cross-domain Learning from Multiple Sources: A Consensus Regularization Perspective", In Proceedings of IEEE Transactions on Knowledge and Data Engineering, vol. 22, Issue 12, Dec. 12, 2010, pp. 1664-1678.

De Felice, "A Corpus-Based Classification of Commitments in Business English", In Yearbook of Corpus Linguistics and Pragmatics 2013—New Domains and Methodologies, vol. 1, 2013, pp. 153-171.

"International Search Report and Written Opinion Issued in PCT Application No. PCT/US19/049617", dated Oct. 22, 2019, 12 Pages.

"Office Action Issued in India Patent Application No. 202117017041", dated Dec. 1, 2022, 6 Pages.

Azarbonyad, et al., "Domain Adaptation for Commitment Detection in Email", In Proceedings of the Twelfth ACM International Conference on Web Search and Data Mining, Feb. 11, 2019, pp. 672-680.

\* cited by examiner

*100*

| 102 — | FROM: | NAME(S) |
| 104 — | TO: | NAME(S)/ADDRESS(ES) |
| 106 — | SUBJECT: | SUMMARY OF EMAIL CONTENTS |
| 108 — | TIME | DATE | TIME |
| 110 — | ATTACHED | ITEM |

112 —

BODY – "I WILL FORWARD ON TO ENTITY X..." — 114

*FIG. 1*

TASK DETECTION IN COMMUNICATIONS USING DOMAIN ADAPTATION

BACKGROUND

The use of email has grown over the past several decades both in terms of total volume (information overload) and in terms of the number of purposes for which email is used (functional overload). Many email programs serve as a communication tool and also as a repository of tasks, a personal archive, and a calendaring tool. While a variety of research has focused on how to support this functional overload by directly integrating task support or calendaring within email clients, little research has focused on how the information present in other data sources can be leveraged to mitigate the information overload. Additionally, little research has focused on search problems present in searching or re-finding items across a personal information management (PIM) (e.g., email) repository.

Prior research included work on automatic email management and task progress monitoring. Prior research on commitment detection and domain adaptation includes research showing that the annotation of commitments and requests in email is challenging, even for humans. A commitment is a promise for a person making the commitment to perform an action and a request is a solicitation for a receiving person to perform a requested action. At least one research project has even devised guidelines for collecting judgments and building datasets for commitment/request classification. One insight of this research is that When statements are given in context (full email) the annotation task is easier and more accurate. Other prior research showed a fine-grained classification of commitments in communications and studies which phrases are associated with commitments.

Automatic commitment classifiers have been developed in other work, however. For example, some research suggesting training classifiers to classify sentences in email into one of the following acts: deliver, commit, request, amend, propose, and meeting. In this research, sentences were represented by term frequency inverse document frequency (TF-IDF) weighted vectors over word n-grams.

Other research has used more sophisticated features for detecting commitments in email, such as named entities, part-of-speech (POS) tags, dependencies, and coreference resolution. This research considered both requests and commitments as commitments.

Yet other research used different kinds of features for detecting tasks in email. This research considered commitments as one of the tasks to be extracted from email and considers both requests and commitments as commitments. This research used a set of features, such as message length, the presence of modal verbs, and question words, and trains a classifier on a set of manually labeled emails. A conclusion of this research was that only some regions of emails are relevant to commitment detection, and other regions often introduce noise.

All these studies used a single dataset for training models and performing analysis. The datasets used in these studies are also small (e.g., less than ten thousand examples used to train the models). Although one study performed a limited analysis on the transferability of commitment models, that study used datasets from the same domain.

Training commitment detection models (and other email-based models) can be impractical using proprietary data for privacy reasons. Instead, these models are trained based on public corpora. A problem with training based on this public data is that the resulting model is biased relative to the private/proprietary target audience, yielding sub-optimal performance on the target. Embodiments provide an approach to reduce or remove bias from models trained using such public corpora. Embodiments can provide models that perform well on the proprietary target, with no, or only minimal inspection, of the target corpora.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A system can include a memory. The system can further include processing circuitry coupled to the memory to implement operations for task classification on a target sample from a target corpus. The task classification can include modifying a representation of a source sentence of a source sample from a source corpus to more closely resemble target sentences of target samples from a target corpus. The task classification can further include operating, using a machine learning model trained using the modified representation of the source sentence, with the target sample to generate a task label, the task label indicating whether the target sample includes a task. The processing circuitry can further cause a personal information manager (PIM) to generate a reminder, based on whether the target sample includes the task.

At least one machine-readable storage medium can include instructions for execution by processing circuitry to perform operations for task detection. The operations can include modifying a representation of a source sentence of a source sample from a source corpus to more closely resemble a representation of target sentences of target samples from a target corpus. The operations can further include operating, using a machine learning model trained using the modified representation of the source sentence, with the target sample to generate a task label, the task label indicating whether the target sample includes a task. The operations can further include causing a personal information manager (PIM) to generate a reminder, based on whether the target sample includes the task.

A method, performed by at least one processor of a computing system, can include modifying a representation of a source sentence of a source sample from a source corpus to more closely resemble a representation of target sentences of target samples from a target corpus. The method can further include operating, using a machine learning model trained using the modified representation of the source sentence, with the target sample to generate a task label, the task label indicating whether the target sample includes a task. The method can further include causing a personal information manager (PIM) to generate a reminder, based on whether the target sample includes the task.

BRIEF DESCRIPTION OF DRAWINGS

FIG. 1 illustrates, by way of example, a diagram of an embodiment of an email interface.

DETAILED DESCRIPTION

Figure 2:
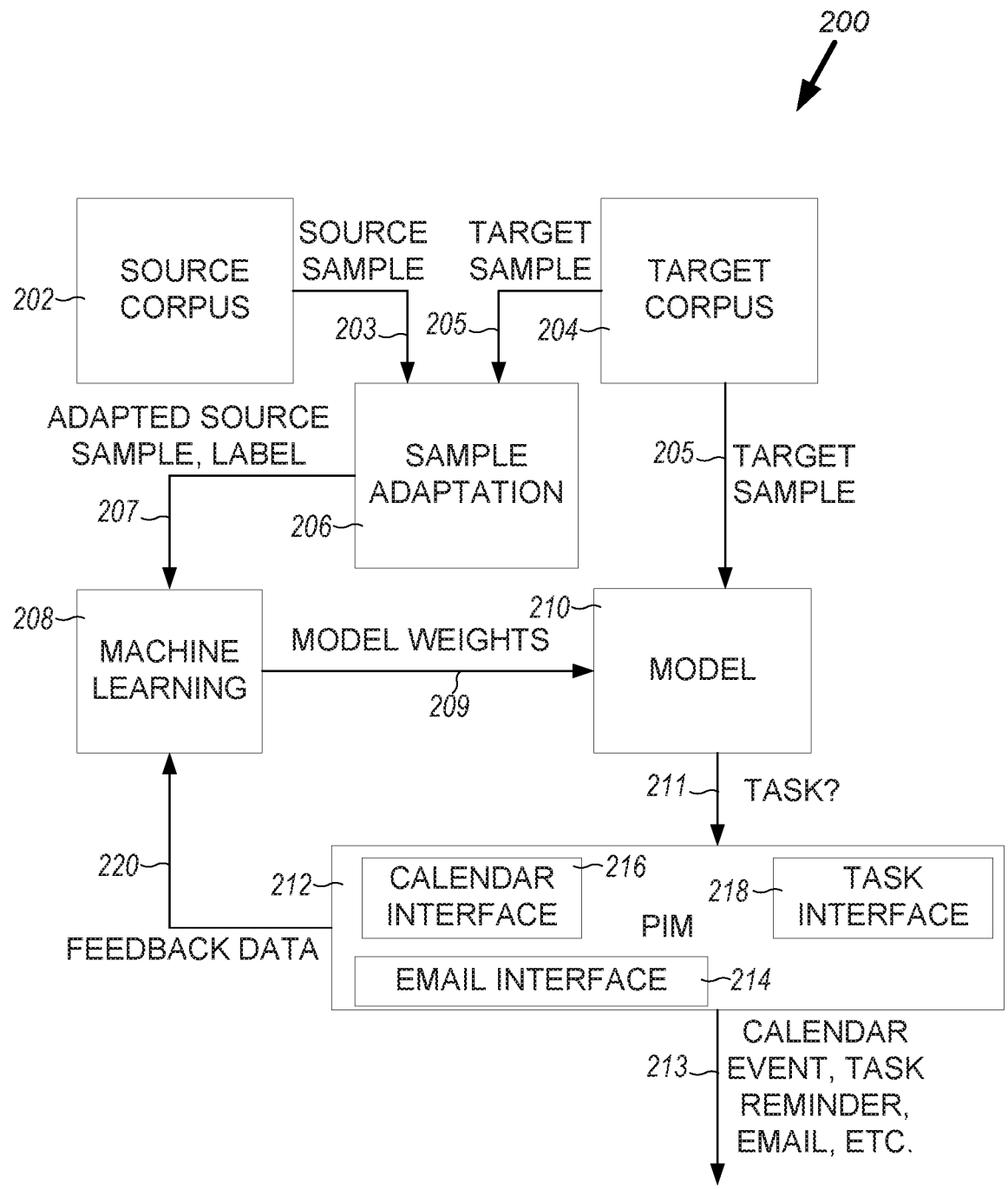
FIG. 2 illustrates, by way of example, a diagram of an embodiment of a system for domain-independent classification of tasks.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine-readable media or storage medium, such as one or more non-transitory memories (e.g., anon-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Email has been an important web-based communication medium for more than 25 years. While email was first designed for asynchronous communication, people have "overloaded" the use of email with other functions such as task management and personal archiving. As online services and the web grow, email not only continues to serve these purposes but an ever-increasing number (e.g., as a receipt file cabinet for e-commerce purchases, as a standard part of identity/authentication flow, and as calendar management).

Regarding calendar management, because meeting arrangement and time negotiation often happen through email, nearly every modern email service—both web email and client applications—offer fully featured calendar management. Despite this integration, the majority of feature development has focused on moving information from email into a user's calendar, but little work has focused on the implications of calendar information for improving other functionality: of a personal information management (PIM) service.

People use email not only as a communication tool, but also to create and manage tasks, and manage a calendar. When the number of ongoing tasks created via emails increases, people can struggle to manage their tasks and monitor their progress. Automatic task management systems (e.g., PIMs) can overcome this problem and help people manage their tasks more efficiently. Commitments, such as "I'll send the report by end of day" are one type of task that involve promises made between individuals to complete future actions. Another type of task is request. A request includes asking another person to perform an action. The tasks detected herein are part of a communication between a user of a first device and a user of a second device. The task can be part of a text, email, instant messaging communication, file, attachment, or the like.

FIG. 1 illustrates, by way of example, a diagram of an embodiment of a task 114 in an email 100 presented on a user interface. The email 100 can be part of a domain of data (sometimes called a corpus), in an XML, HTML, or other format, with metadata describing the content of the email 100. The email 100 as illustrated includes a from: line 102, a to: line 104, a subject 106, a time 108 attachment(s) 110, and a body 112. The from: line 102 indicates from whom the email 100 originated. The to: line 104 indicates to whom the email 100 was sent. In many emails, the to: line includes a copy contact and a separate blind copy contact (bcc:) line. The subject 106 generally summarizes a content to be covered in the email 100. The time 108 is generally time zone dependent and indicates a date and time of the email 100. The attachment(s) 110 are resources that the sender indicated in the from: line 102 deem to be relevant to the email 100, The body 112 includes text, images, or other data describing, in greater detail, the reason for the email 100. Any of the information of the email 100 can be used to help identify a task made in the email 100. For example, the body 112 in the email 100 includes the task 114 "I will forward on to entity X . . . ".

Such tasks are often expressed in email or other communications, such as direct messages, calendar events, or the like, and users can struggle to recall and complete them in a timely manner. Detecting tasks (e.g., automatically, such as without human interference after deployment or installation) and providing a reminder of the task, enables task management tools, such as a personal information managers (PIMs), or digital assistants to generate reminders or notifications to help users meet their obligations. Despite the potential benefits of automatic task detection, work in this important area has been limited to only a handful of studies.

Commitments involve promises made between individuals to complete future actions. Detecting commitments made in communications (e.g., "I'll send the report by end of day") enables PIMs to help users recall promises they have made and help users complete them in a timely manner. Embodiments herein can reliably detect commitments and other tasks in emails, instant messages, text messages, files, attachments, transcripts of phone calls or meetings, team collaboration tools, or other communications. The embodiments can use one or more machine learning models that are trained on a first domain (e.g., a corpus of communications generated in a first context) and implemented to label sentences of communications from a second domain (e.g., corpus of communications generated in a second context).

Prior commitment detectors realize performance degradation when the test domain differs from the trained domain. It is not always practical to train a detector directly using samples from a test domain. This can be due to unavailability of test data at training time, or because access to the test data is restricted for privacy reasons. This illustrates a domain bias associated with communication datasets and a need for more robust and generalizable models for task detection, and task extraction in general.

Embodiments herein can learn a domain independent task model, such as to reduce the degradation realized when the test domain differs from the trained domain. In embodiments, the differences between domains (communication corpora) are identified and used to transfer knowledge between domains. This knowledge transfer can be at different levels of granularity: feature-level adaptation, sample-level adaptation, or a combination thereof. Other embodiments can use a neural autoencoder trained, such as in an adversarial fashion, to learn a domain-independent representation for training samples. Transfer learning can help remove domain bias to obtain models with less domain dependence. The domain differences can have a significant negative impact on the quality of communication-based models. Embodiments, through transfer learning, can help address this issue.

Task detection is challenging for at least two reasons. First, the task detection operation itself is inherently difficult, even for humans, and particularly difficult when the text is short and there is limited context. Second, communication models are trained and shipped to users based on potentially biased datasets. For both privacy and practical reasons, communication-based models are often derived from public datasets, which are skewed in a variety of ways. For example, a dataset known as "Enron Email Dataset" (herein simply "Enron") compiled by Cognitive Assistance that Learns and Organizes (CALO) project, that includes mostly emails from senior officials at the company known as Enron, and a dataset known as "Avocado Research Email Collection" (herein simply "Avocado") that includes emails and attachments from a now defunct information technology (IT) company of the name Avocado, are two commonly used email datasets for learning email models. These datasets belong to two organizations with different focus areas and contain emails from different time periods. Terminology, including named entities and technical jargon, vary greatly across domains and over time. This means that models learned on one dataset may be biased and might not perform well on a different target dataset at a future point in time. These biases can affect the models trained on these email corpora.

Transfer learning is a domain adaptation method that enables knowledge learned in one domain (source domain) to another domain (target domain). Using this approach for transferring knowledge learned from one communication collection to another may help achieve more robust and generalizable models for task detection.

Discussed herein are some approaches to transfer learning. The context of this discussion is for task detection, however the embodiments are applicable to other contexts as well, such as image classification, text classification, security, or the like. In various examples, sentences are extracted from text, such as from one or more of an email, attachment, calendar event, meeting, direct messaging service, text message, or other communication. Labels can be assigned to at least some of the sentences indicating whether the sentence corresponds to a task.

Multiple techniques for transfer learning are presented herein. These include feature-level adaptation, sample level adaptation, and a transfer learning autoencoder. For feature-level adaptation, a mapping between features (e.g., n-grams) of source and target domains is identified and the mapping is used to transfer the features of the source domain to the target domain and learn the classifier using the transferred data.

Given a set of labeled samples from a source corpus "S", a goal can be to create a model that has a high task detection accuracy when it is applied to a target sample of the target corpus "T". Three different techniques, along with variations thereof, for transferring classification knowledge between domains are provided in FIGS. 2-5 respectively: feature-level adaptation (FIG. 3), sample-level adaptation (FIG. 2), and an autoencoder (FIGS. 4 and 5) that leverages both feature-level adaptation and sample-level adaptation.

FIG. 2 illustrates, by way of example, a diagram of an embodiment of a system 200 for domain-independent classification of tasks. The system 200 as illustrated includes a source corpus 202, a target corpus 204, a sample adaptation program 206, a machine learning program 208, a model program 210, and a PIM 212.

The source corpus 202 includes source samples 203 (e.g., files, documents, packets, data streams, or the like, such as email data, attachments, calendar event data, appointment data, digital note data, direct messaging data, text data, or the like). The source samples 203 can be created in a specific culture or geographical region in which the customs of indicating tasks can have unique nuances that are not realized elsewhere. The source samples 203 are thus produced using a first lexicon.

The target corpus 204 includes target samples 205 similar to the source samples 203 with the target samples 205 generated with different customs of indicating tasks (e.g., using a different lexicon). The target samples 205 are to be classified by the model program 210 that is trained based on the source samples 203 or adapted source samples 207.

Sample adaptation, the operations performed by the sample adaptation program 206, is sometimes called importance sampling. Importance sampling is a technique to estimate the parameters of a distribution (distribution of the target corpus 204) given samples generated from a different distribution (distribution of the source corpus 202). Assume there are two distributions: $P_S(x, y)$ from which samples in the source corpus 202 are generated, and $P_T(x, y)$ from which samples in the target corpus 204 are venerated. In the setting for a task detection operation, x is a sentence and y is its corresponding task label. Assume that the goal is to create a model using labeled samples from S while optimizing the objective (e.g., the classifier loss) for samples in T. An importance sampling approach for classification can operate as follows. As mentioned, a goal can be to find parameters of the classifier that minimize the loss for the samples in T, given samples from S, $X_S=\{(x_i^S, y_i^S)\}_{i=1}^N$:

$$\theta^* \approx \mathrm{argmin}_\theta L(X_S, \theta \mid T)$$

$$\theta^* \approx \mathrm{argmin}_\theta \sum_{i=1}^N P_T(x_i, y_i) l(x_i, y_i, \theta) \approx$$

-continued $$\underset{\theta}{\operatorname{argmin}} \sum_{i=1}^{N} \frac{P_T(x_i, y_i)}{P_S(x_i, y_i)} P_S(x_i, y_i) l(x_i, y_i, \theta) \approx$$

$$\underset{\theta}{\operatorname{argmin}} \sum_{i=1}^{N} \frac{P_T(x_i) P_T(x_i \mid y_i)}{P_S(x_i) P_S(x_i \mid y_i)} P_S(x_i, y_i) l(x_i, y_i, \theta) \approx$$

$$\underset{\theta}{\operatorname{argmin}} \sum_{i=1}^{N} \frac{P_T(x_i)}{P_S(x_i)} P_S(x_i, y_i) l(x_i, y_i, \theta)$$

An assumption in the above derivation is that $P_T(y_i|x_i) = P_S(y_i|x_i)$, which implies that the conditional probability of classes given the samples is independent of the domain $$\frac{P_T(x_i)}{P_S(x_i)}$$

is often referred to as the importance weight. Given the above derivation, a classifier can be trained using the samples 203 from the source corpus 202, modified by their importance weight. $P_S(x_i)$ and $P_T(x_i)$ are the marginal distributions of samples in the source corpus 202 and target corpus 204, respectively. To find θ', source samples 203 from the source corpus 202 and also the estimation of $P_S(x_i)$ and $P_T(x_i)$ can be used.

To estimate $P_S(x_i)$ and $P_T(x_i)$, a set of source samples 203 from the source corpus 202 and a set of target samples 205 from the target corpus 204 can be used. The target samples 205 can be considered as a positive class and the source samples 203 can be considered a negative class. A domain classifier of the sample adaptation program 206 can be trained to predict, for each sample, how likely it is that the sample was generated from target corpus 204. An LR model can be used to train the domain classifier. For each sample $x_i$, $P_T(x_i)=p$ and $P_S(x_i)=1-p$, where p is the probability that $x_i$ is generated from the target corpus 204, T, assigned by the trained domain classifier to $x_i$.

The adapted source sample 207 (re-weighted source sample) and a corresponding source sample label can be provided to a machine learning program 208. The machine learning program 208 can use statistical techniques that give a computing device an ability to "learn", or more accurately, infer a most likely result based on determined statistics. The machine learning program 208 can be particularly useful to solve problems where there is no obvious heuristic for solving a problem. Two types of machine learning programs include supervised teaming and unsupervised learning. Supervised machine learning includes providing a model with example inputs and corresponding desired outputs. Weights of the model are updated such that the desired output is generated by the model when provided with the corresponding input. The model can then be provided with an input it has not operated on previously to predict to which output the input corresponds. In unsupervised learning, the input and output examples are not provided to the model, and the model is left to find structure in the input on its own. Unsupervised learning can be used to identify features of the inputs that can be used to uniquely identify the inputs. Embodiments herein can apply supervised learning to a problem of task extraction from communications.

In some embodiments, the machine learning program 208 can include a neural network. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many machine learning applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph if the threshold is not exceeded then, generally, the value is not transmitted to a down-graph neuron and the synaptic connection remains inactive. The process of weighting and testing continues until an output neuron is reached, the pattern and values of the output neurons constituting the result of the NN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN here "forward" means that the data starts at the input neurons and follows the directed graph of neuron connections until the output neurons are reached and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD). Adam, etc.

For machine learning of the adapted source sample 207 (and label), a supervised technique can be employed. Importance sampling can be provided by the machine learning program 208 and used to weight training samples (the adapted source sample 207) of the source corpus 202 based on their similarity to the target samples 205 of the target corpus 204. The weighted samples in the source corpus 202 can be used to learn, by the machine learning program 208, a classifier. Specific machine learning techniques, that can be implemented by the model program 210 using the weights 209 include decision tree learning, association rule learning, NNs, deep learning, inductive logic programming, support vector machines, clustering, Bayesian network, reinforcement learning, representation learning, similarity and metric learning, sparse dictionary learning, genetic techniques, rule-based machine learning, and learning classifier systems.

The model program 210 can implement the classifier. The model program 210 can receive a target sample 205 and produce an output indicating whether the target sample 205 corresponds to a task 211. The machine learning program 208 can learn weights 209 to be applied to a model to form a classifier to be implemented by the model program 210. Features of the sample 203, 205 that are indicative of a task include, for example, "i will", "i", "will", "i'll", "let you know", "let you", "call you", "i shall", "we will", "will call", among others.

The model program 210, as discussed, can produce an indication of whether the target sample 205 corresponds to a task 211. The task 211 can include one or more of a binary value indicating whether the target sample 205 corresponds to a task or not (e.g., a logical "1" can indicate that the target sample 205 corresponds to a task and a logical "0" can indicate that the target sample 205 does not correspond to a task, or vice versa), a value indicating a type of task to which the target sample 205 corresponds (e.g., a promise to perform an action, such as to setup a meeting, attend a meeting, walk a dog, send flowers, send an email or document, pay a debt, contact another person not included in the target sample 205, mow the lawn, or any other action), a time corresponding to the task 211, a time at which to remind a user of the task 211, or the like. Alternatively, the PIM 212 can receive the target sample 205 for which a task is detected and can determine the type of task, the time corresponding to the task 211, a time at which to remind the user of the task 211, or the like.

The PIM 212 can include a calendar interface 216, an email interface 214, and a task interface 118. Examples of PIM include Outlook from Microsoft Corporation of Redmond, Wash., United States of America (USA), Gmail from Google of Menlo Park, Calif., USA, EssentialPIM from Astonsoft Ltd. of Estonia, Amazon Simple Email Service (SES) from Amazon.com, Inc. of Seattle, Wash., USA, Thunderbird from the Mozilla Foundation of Mountain View, Calif. USA, eM Client from eM Client, Inc. of San Francisco, Calif. USA, and Zimbra Desktop from Synacor, Inc. of Buffalo, N.Y. USA, among others. Not all PIMs include the email interface 214, calendar interface 216, and task interface 118 functionality. Embodiments can integrate with one or more separate calendar, email, or task PIMs so that the PIM 212 does not need to include all of the email, task, and calendar functionality.

A user, or the PIM application 212 without user intervention, can manage appointments, meetings, tasks, and/or reminders through the calendar interface 216. The calendar interface 216 provides an interface through which data regarding a date, time, people attending, subject, attachments, a description of an event (e.g., a body), a reminder time, or the like, can be recorded. There are many configurations for calendar interfaces and embodiments are not limited to a particular calendar configuration.

A user, or the PIM application 212 without user intervention, can manage electronic mail through the email interface 214. The email interface 214 provides an interface through which to organize, access, search, store, delete, or perform other operations on email. There are many configurations for email interfaces and embodiments are not limited to a particular email configuration.

A user, or the PIM application 212 without user intervention, can manage tasks through the task interface 218. The task interface 218 provides an interface through which to organize, access, search, store, delete, edit, or perform other operations on tasks to be performed. There are many configurations for task interfaces and embodiments are not limited to a particular email configuration.

The PIM 212, after receiving the task 211 (or determining how to handle the task 211) can automatically (without human intervention) schedule a meeting, appointment, or the like to be presented to a user through the calendar interface 216, draft an email to be presented to a user through the email interface 214, or generate a task to be presented to the user through the task interface 218. The interface (e.g., the email interface 214, calendar interface 216, or the task interface 218) can present a user with an explanation as to why the email, calendar event, or task is created. For example, the interface can display a software control with text explaining "You committed to sending this email in another email to entity X dated time Y. Please edit and select 'send' if you wish to fulfill the task, select 'remind me later' for a reminder at a later time, or otherwise select cancel' to terminate this task". Through the interface, the user can thus, set reminders, establish tasks, send emails, create appointments or meetings, or the like, based on the task 211.

In some embodiments, a user may have already scheduled a meeting, sent an email, generated a task, or the like, due to the task 211 in the target sample 205. The PIM 212 can search the emails, tasks, and calendar events of the user to determine whether the user has setup or sent such a reminder, email, task, or calendar event. The PIM 212 can take no action if such a reminder, email, task, calendar event, or other task 213 has been setup or sent or can automatically generate the task 213 if such a reminder, email, task, or other task 213 has not been setup or sent.

In some embodiments, a user can provide data to the PIM 212, such as through the email interface 214, the calendar interface 216, the task interface 218, a pop-up box, or other interface. The data provided by the user can be feedback data 220. The feedback data 220 can indicate whether the sample 205 includes a task. The feedback data 220 from the user, the prediction (the task 211) from the model 210, the target sample 205, or other data, can be provided to the machine learning program 208. The feedback data 220 can be used to update input-output examples or otherwise update data for training the model program 210.

Figure 3:
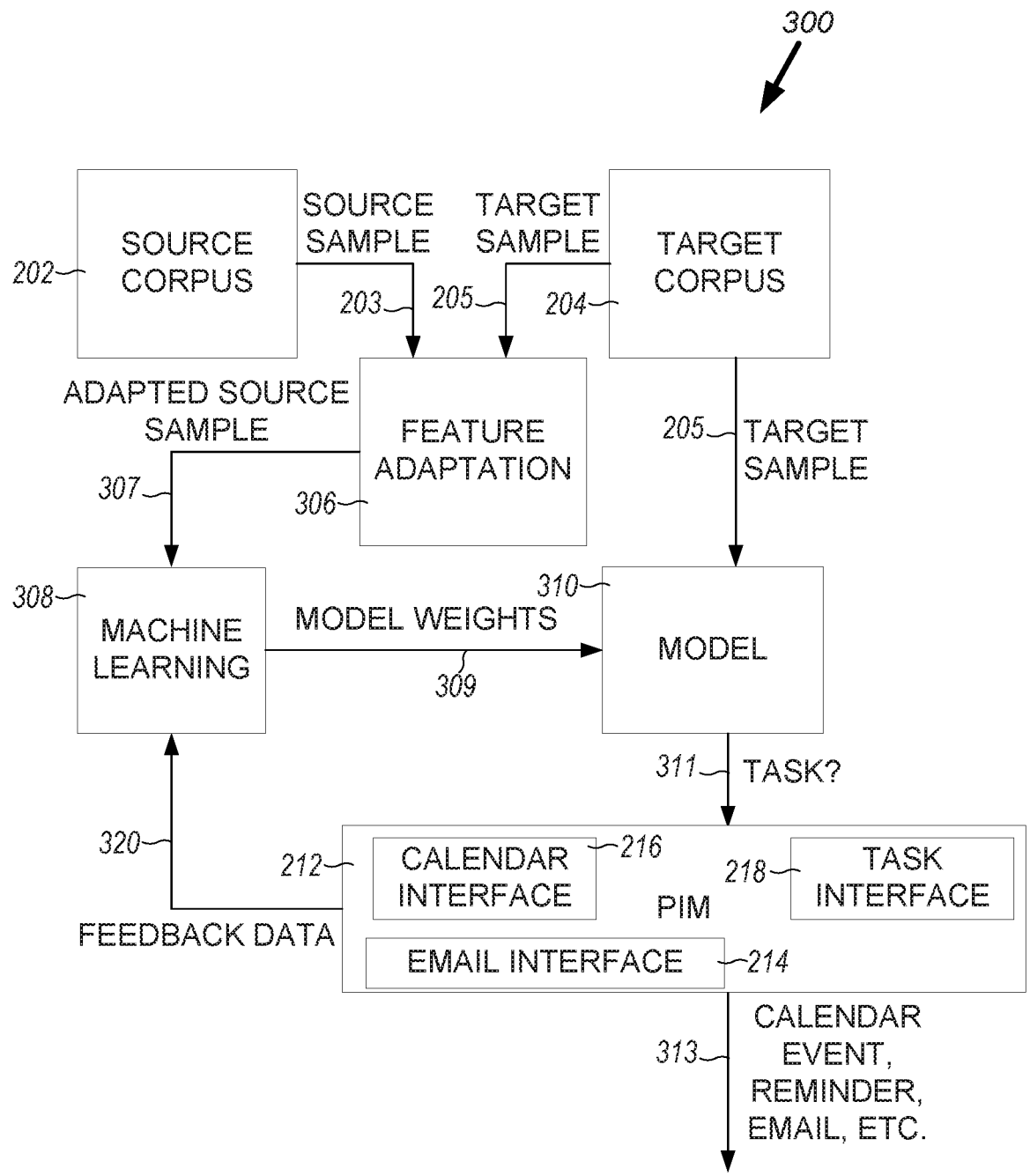
FIG. 3 illustrates, by way of example, a diagram of another embodiment of a system for domain-independent classification of tasks.

FIG. 3 illustrates, by way of example, a diagram of another embodiment of a system 300 for domain-independent classification of tasks. The system 300 is similar to the system 200, with the system 300 including a feature adaptation program 306 in place of the sample adaptation program 206. Note that some items of FIG. 3 have a same name as items of FIG. 2, but different reference numbers. This indicates that the item can perform different operations or have different structure than the item of FIG. 2 with the same name. However, the general description of an item with the same name is similar, it is just different in the ways described with regard to FIG. 3.

The feature adaptation program 306 receives the source sample 203 and target sample 205 and generates the adapted source sample 307. The adapted source sample 307 includes a representation of the source sample 203 modified to be more like the representation of the target sample 205. The modification can include a word substitution, substituting a representation of a word with a representation of another word, or the like. For example, consider an embodiment in which the source corpus 202 includes emits from a gas company and the target corpus 204 includes emails from an electrical company. The feature adaptation program 306 can learn or otherwise be programmed to replace representations of the term "gas" in the source sample 203 with a representation of the term "electricity", or the like, to generate the adapted source sample 307. Other replacements can include people in one company using acronyms such as "OOO" (out of office) to mean unavailable and people in another company using "unavailable", "on vacation", or the like to mean the same thing. These differences can appear in emails or other communications. A model trained without knowledge of these differences can be less accurate in classifying the target sample 205 than a model trained with knowledge of these differences. Many other examples of these differences exist and are within the scope of this disclosure.

The feature adaptation program 306 learns features of the source sample 203 and the target sample 205. In some embodiments, the feature adaptation program 306 can determine a mapping between the learned features of the source sample 203 and the target sample 205. Assume that $F_s^i$ is a set of features of samples from the source corpus 202 and $F_t^j$ is a set of features of samples from the target corpus 204. The feature adaptation program 306 can learn a mapping as follows $F_t^j \approx \varphi(F_s^i)$, where $\varphi$ is a function that approximately transforms a feature $F_s^i$ into a feature $F_t^j$. The adapted source sample 307 can include the source sample 203 modified by the learned transform, $\varphi$.

Features of the target sample 205 or the source sample 203 can include one or more words, phrases, sentences, symbols, characters, images, a combination thereof, a portion thereof or the like. The features extracted from the source sample 203 or the target sample 205 can be indicative of a task or aid in determining whether there is a task in the sample. For example, a feature of the source sample 203 can include the characters "CYL". These characters can be indicative of a task to call someone later ("call you later"). The feature adaptation program 306 can replace one or more values indicative of "CYL" in the source sample 203 with a value indicative of the phrase "call you later" to create the adapted source sample 307. Another example includes replacing all values indicative of the word "electricity" with one or more values indicative of the word "gas" or "petroleum", or the like. This replacement can help the machine learning program 308 create weights that account for differences in the general nomenclature in the source corpus 202 and the target corpus 204. These are just examples of feature adaptation and corresponding learning intended to provide a deeper understanding of the operation of the feature adaptation program 306, the adapted source sample 307, the machine learning program 308, and the model weights 309.

More generally, feature-level adaptation techniques, such as implemented by the feature adaptation program 306, try to remove the domain bias from features by removing domain specific features or transforming the features from a source corpus lexicography to a target corpus lexicography. Learning a mapping between features of different domains have been studied in machine translation. Here, in contrast, the domains are two different lexicons. The feature adaptation program 306 can implement one or more of two feature-level adaptation techniques: feature selection and feature mapping. Feature mapping was discussed previously.

Feature selection includes detecting domain-specific features in the source corpus 202 and the target corpus 204 and removing them from the train and test samples. In feature selection, it is assumed that there is a set of unlabeled source samples 203, $D_S$, in the source corpus 202 and a set of unlabeled target samples 205, $D_T$, in the target corpus 204. To remove domain specific features from the samples 203, 205, a domain classifier of the feature adaptation program 306 can be trained using the source samples 203 as "positive" samples and the target samples 205 as "negative" samples. The classifier can be trained to discriminate between the source samples 203 and the target samples 205. The classifier can identify the most discriminative (informative) features of the samples 203, 205. Logistic regression (LR), or another machine learning technique for classification, can be used for training the classifier. The top-K features from the classification model can be recorded. The top-K features of the source samples 203 can be replaced with a unique symbol prior to training. A similar procedure can be used to remove domain-specific words from the target samples 205 of the target corpus 204. After removing domain-specific information from the source samples 203 and the target samples 205, a task classifier can be trained, such as by the machine learning program 308, on the adapted source samples 307. The task classifier, the model program 310, can be used to predict the task labels on the target samples 205 from the target corpus 204. The task classifier is an example of the model program 310.

Feature mapping identifies equivalent features between source and target domains and transform the features from the samples 203, 205 to their equivalents in the other samples 205, 203 before training a task classifier (the model program 310). Features, in some embodiments can be word n-grams (e.g., 1≤n≤3). An assumption of the feature mapping technique can include, for each feature in source (target) domain, there is an equivalent feature in the target (source) domain. Therefore, for each domain specific feature in the source corpus 202, there is a domain specific equivalent in the target corpus 204, and a goal can be to find these equivalences.

Embodiments of the feature adaptation program 306 are now described in more detail. Assume that there is a set of samples 203, 205 in each domain. Sentences can be extracted from the samples 203, 205. For each domain, a semantic space can be learned in which each feature is represented as a low-dimensional neural embedded vector. In some embodiments, a skipgram architecture of Word2Vec, a two-layer NN from Mikolov et al. can generate the embeddings of words. A linear transformation between the embedding spaces of source samples 203 and target samples 205 can be determined. The linear transformation ($\varphi$) can be used for transforming features between domains. A word embedding is a natural language processing technique where one or more words, phrases, symbols, characters, or the like, are mapped to respective vectors of real numbers. Word embedding is a sort of compression as it takes input that is in a space that has one dimension per word and maps each word to a vector space with a lower dimension. The mapping can be generated using an NN, dimensionality reduction on a word co-occurrence matrix, probabilistic models, explainable knowledge base method, and explicit representation in terms of the context in which words appear.

Linear mapping-based transformations of embeddings between spaces have been used for translation and detecting semantic shifts. In embodiments, a set of words can be picked as anchors between domains and training samples for learning the mapping. Stop words (e.g., "to", "the", "of", "in", "and", "or", or the like) can be used as anchors. Stop words should have the same meaning in both domains and they can serve as fixed points around which features with varying meanings (usages) can be learned. Using the training samples, the goal can be to learn a transformation matrix $W^{ST}$ from domain, S, to domain, T, that minimizes the distance between the words and their mapped vectors.

The objective function of such a function to be minimized by the learning can include:

$$\operatorname*{argmin}_{W^{ST}} \sum_{W} \|W^{ST} V_W^S - V_W^T\|^2$$

The sum can be taken over the training features. A standard stop word list can be used, such as with a few additional words added (e.g., very frequent words in the corpus 202 or 204) to learn the transformation matrix $W^{ST}$. A gradient descent technique can be used to optimize the objective function. $V_w^S$ and $V_w^T$ are the embeddings of feature, w, in the embedding spaces created for the source corpus 202 and the target corpus 204, respectively. Using the learned transformation, the mapping of a feature, $w_S$, from source corpus 202 in target corpus 204 can be determined as follows:

$$M(w) = \operatorname*{argmax}_{W_T \in F_T} \cos(W^{ST} V_W^S, V_{W_T}^T) \qquad \text{(Equation 2)}$$

where cos is the cosine similarity and $F_T$ is the set of all features (n-grams) in the target domain, T.

The machine learning program 308 is similar to the machine learning program 208, but the machine learning program 308 operates on different input, namely the feature adapted source sample 307 rather than the sample adapter source sample 207. The machine learning program 308 thus, very likely, produces different weights 309 than the machine learning program 208. Similarly, the model program 310 is likely different than the model program 210 since the weights 309 are likely different than the weights 209. The goal of the model program 310 is the same as the model program 210, though. Namely, to identify whether the target sample 205 includes a task and produce the task 311. The task 311 can include similar information as the task 211. The PIM 212 can receive the task 311 and produce a task reminder 313. The task reminder 313 is only different from the task reminder 213 in that it is produced based on a different input, namely the task 311 rather than the task 211.

Figure 4:
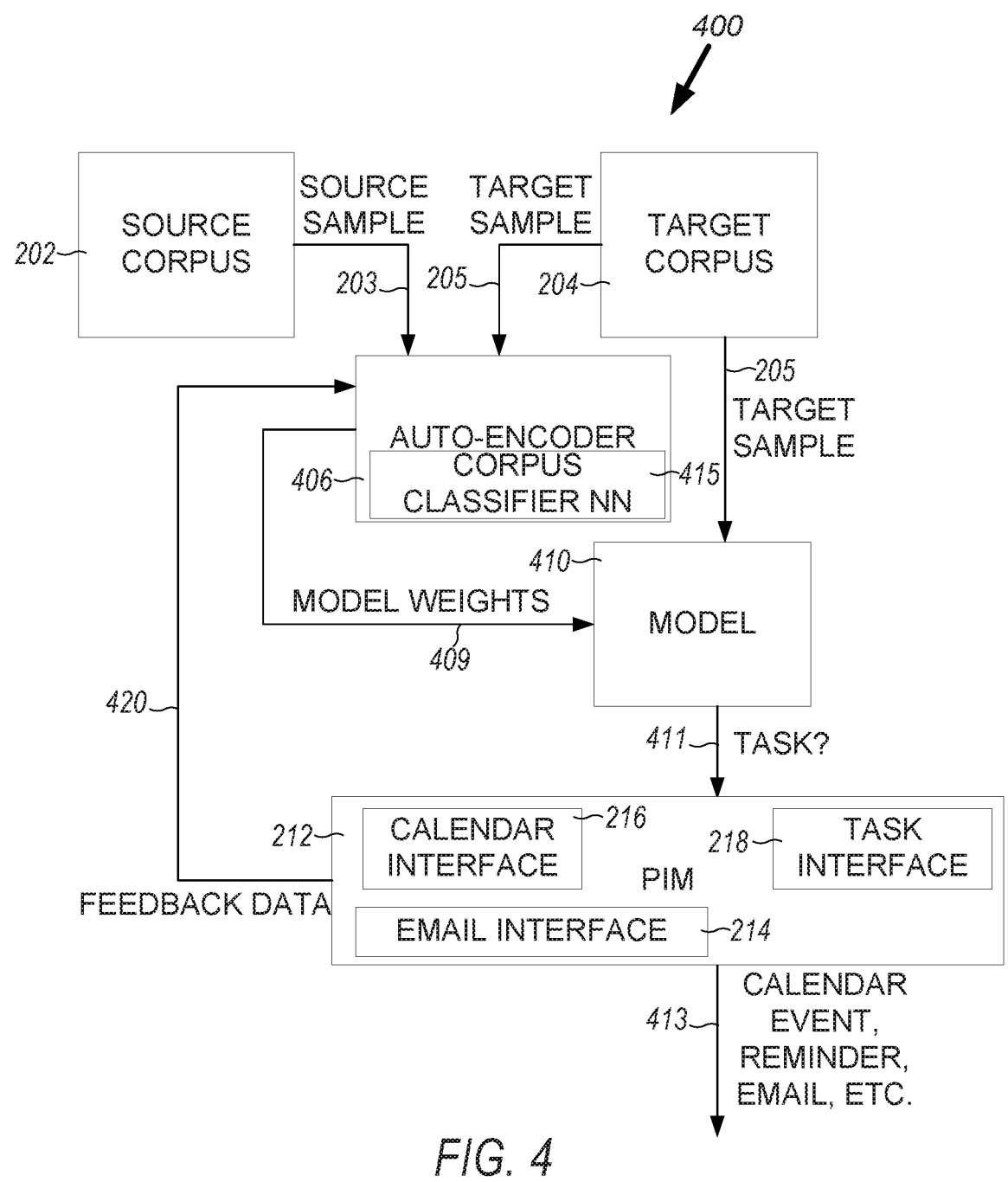
FIG. 4 illustrates, by way of example, a diagram of another embodiment of a system for domain-independent classification of commitments.

FIG. 4 illustrates, by way of example, a diagram of another embodiment of a system 400 for domain-independent classification of tasks. The system 400 is similar to the systems 200 and 300, with the system 400 including an auto-encoder program 406 in place of the sample adaptation program 206 and the machine learning program 208 or the feature adaptation program 306 and the machine learning program 308. Note that some items of FIG. 4 have a same name as items of FIGS. 2 and 3, but different reference numbers. This indicates that the item can perform different operations or have different structure than the item of FIG. 2 or 3 with the same name. However, the general description of an item with the same name is similar, it is just different in the ways described with regard to FIG. 4.

The auto-encoder program 406 learns weights 409 of a model program 410 that minimize a cost function. The auto-encoder program 406 can include at least one NN configured to reduce a reconstruction loss and a classification loss, while increasing a domain classification loss, such that the model program 410 cannot discern from which corpus 202 or 204 a sample came from, after the auto-encoding.

The model program 410 is very likely different than the model programs 210 and 310 at least because the weights 409 are very likely different than the model programs 210 and 310 as they are generated via distinct training processes. A goal of the model program 410 can be the same as the model programs 210 and 310, though. Namely, to identify whether the target sample 205 includes a task and produce the task 411. The task 411 can include similar information as the tasks 211 and 311 (with or without task labels). The task 411 is different from the tasks 211 and 311 as it is produced by a different model program 410, thus the result of the model program 410 can be different. The PIM 212 can receive the task 411 and produce a task reminder 413. The task reminder 413 is only different from the task reminder 213 and 313 in that it is produced based on a different input, namely the task reminder 413 rather than the task reminder 213 or 313.

The autoencoder program 406 can be trained in an adversarial fashion, such as to maximize a task classification accuracy while minimizing a reconstruction loss and minimizing corpus classification accuracy. To remove domain specific information from representations of samples, a domain classifier program 415 can be added to the autoencoder. In some embodiments, the domain classifier program 415 can be implemented using an NN. Given a training sample (e.g., the source sample 203 or the target sample 205) from the source corpus 202 or the target corpus 204, the domain classifier 415 can attempt to predict the domain (e.g., source corpus 202 or the target corpus 204) to which the sample 203 or 205 belongs. The domain classifier 415 can be trained in an adversarial setting in which, during training, its accuracy can be minimized. By minimizing domain classifier accuracy, domain-specific information can be removed from the samples 203, 205.

The quality of task detection degrades significantly as task detection models are applied across domains. That is, if a model program 410 is produced based on weights learned from the source sample 203 of the source corpus 202, it is not accurate in predicting tasks in target samples 205 from the target corpus 204. As previously discussed, different approaches for characterizing differences between communication corpora and domain adaptation (specifically, transfer learning) can remove domain-specific bias from task detection models. Domain adaptation methods discussed herein provide significant gains in the precision and recall of task detection models.

A goal of using the auto-encoder program 406 can be using a set of combined samples from source and target domains to learn a representation that is domain independent. After creating the representation, a classifier (the model program 410) can be trained on the de-biased representations (the representation produced by the autoencoder program 406). Sample-level adaptation and feature-level adaptation can be combined using the autoencoder program 406.

The present embodiments can remove the domain bias by introducing the domain classifier 415 which can be trained in an adversarial fashion.

Embodiments herein can apply adversarial training to domain adaptation. Embodiments can include adding a domain classification loss to the task's loss and trying to maximize the domain loss. Maximizing the domain loss can help ensure that the learned representations do not contain domain information. Similarly, embodiments can use adversarial training for learning representations of sentences. However, embodiments can extend this work by using a sequence-to-sequence autoencoder to the model for learning representations.

Figure 5:
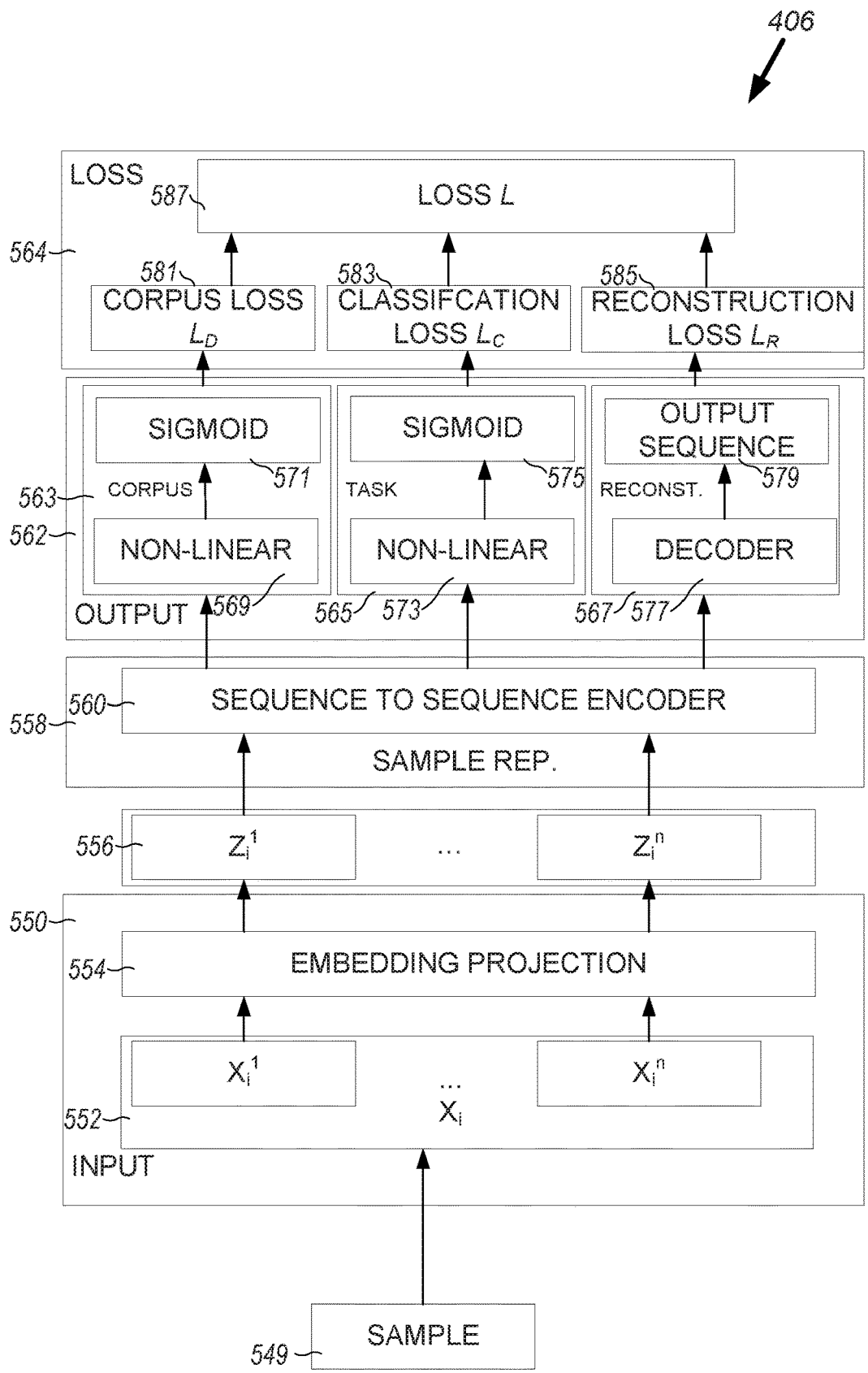
FIG. 5 illustrates, by way of example, an exploded view diagram of an embodiment of the auto-encoder.

FIG. 5 illustrates, by way of example, an exploded view diagram of an embodiment of the auto-encoder program 406. The auto-encoder program 406 as illustrated includes an input program 550, a sample representation program 558, an output program 562, and a loss functions 564.

Deep autoencoders have been shown to be successful in unsupervised feature extraction and representation learning. These models are unsupervised and model the underlying distribution from which the data is generated. In a transfer learning setting, autoencoders can be used to learn a representation for a combined set of samples from a source corpus 202 and a target corpus 204. Using the samples from both source corpus 202 and the target corpus 204, the auto-encoder program 406 can learn a model that represents samples from both corpuses 202 and 204. The learned representation produced by the model program 410 can be domain independent.

After learning the representations, representations of samples in the source corpus 202 (with their labels) can be used for training a classifier. Note that this approach can use a set of labeled samples of samples from the source corpus 202 and a set of unlabeled samples from the target corpus 204.

A task detection problem is presented next, and then an auto-encoder model of embodiments is described. Details of items of the autoencoder program 406 including an input program 550, sample representation program 558, output program 562, and loss functions 564 are then described.

Assume a set of task sentences from the source corpus 202 $X_S=\{(x_i^S, y_i^S)\}_{i=1}^{N}$ and a set of task sentences from the target corpus 204 $X_T=\{(x_i^T, y_i^T)\}_{i=1}^{M}$ are available.

Autoencoder embeddings 556 can be produced using an embedding projection program 554 trained using unlabeled source samples 203 from the source corpus 202 and target samples 205 from the target corpus 204. In some embodiments, the source projection program 554 can include an NN. A set of labeled target samples 205 can be applied, in addition to the source samples 203, for training the sample representations and output program 560. Both $X_S$ and $X_T$ can be used to create a corpus classifier 563 that has good task detection performance on both source samples 203 from the source corpus 202 and target samples 205 from the target corpus 204 (e.g., a performance that is about the same on both source samples 203 and target samples 205).

The autoencoder program 406, in general, receives a candidate sentence (e.g., the sample 549) and predicts how likely it is that the sentence constitutes a task (e.g., between an email sender and an email recipient). The autoencoder program 406, as illustrated, includes three main components, the input program 550 that provides a set of functions for encoding each input sentence $x_i$ to a sequence of dense vectors $\{z_i^j\}_{j=1}^{n}$ where $z_i^j \in \mathbb{R}^d$ corresponds to an embedding of a jth word in the sentence and n is the number of words in the sentence. For simplicity, it can be assumed that d is the dimension of the representation vector of words.

The sample representation program 558 is provided the embeddings 556 of the input program 550 (the sequence of embeddings 556). The sample representation program 558 learns a representation for the input sentence 552. The output of the sample representation program can be a vector $s \in \mathbb{R}^{d_1}$, which is an aggregated representation of the input sentence 552. Further details of the sample representation program 558 are provided elsewhere herein.

The output program 562 determines how likely the input sentence 552 includes a task based on the representation of the sentence 552 that is provided by the sequence-to-sequence encoder 560.

The input program 550 can projects input sentences 552 to a set of sequence dense vectors with dimension d using at least one trainable embedding program 554. Each vector in the input 552 can correspond to a word.

Figure 6:
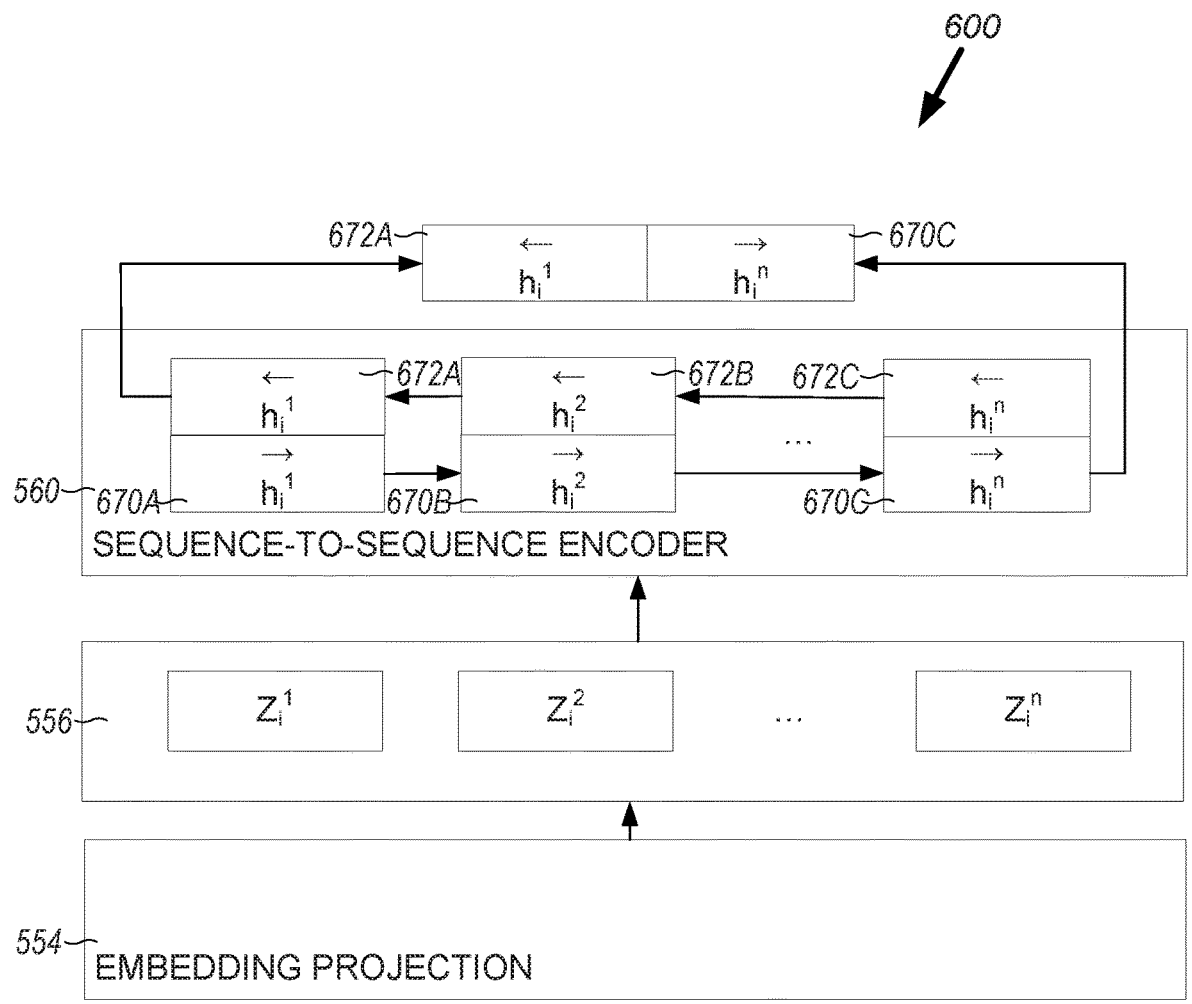
FIG. 6 illustrates, by way of example, an exploded view diagram of an embodiment of the sequence to sequence encoder.

FIG. 6 illustrates, by way of example, an exploded view diagram of an embodiment of the sequence to sequence encoder 560, To represent samples, the sample representation program 558 can include a sequence-to-sequence encoder 560. The sequence-to-sequence encoder 560 can include a recurrent neural network (RNN) or other NN. The sequence-to-sequence encoder 560 receives the embeddings 556, $Z_i=[z_i^1, z_i^2, \ldots, z_i^n]$ (the embeddings of the emeddings 556) in a "left-to-right" direction in a forward pass. The sequence-to-sequence encoder 560 can create a sequence of hidden states 670A-670C, $[\overrightarrow{h_i^1}, \overrightarrow{h_i^2}, \ldots, \overrightarrow{h_i^n}]$, where $\overrightarrow{h_i^j}$=RNN$(z_i^j, \overrightarrow{h_i^{j-1}})$ is a dynamic function for which, for example, a long short term memory (LSTM) or a gated recurrent unit (GRU) can be used. The backward pass of the sequence-to-sequence encoder 560 reads $Z_i$, the embeddings 556, in the reverse direction, namely $\overleftarrow{h_i^j}$=RNN$(z_i^j, \overleftarrow{h_i^{j+1}})$, resulting in a sequence of hidden states 672A-672C $[\overleftarrow{h_i^n}, \overleftarrow{h_i^{n-1}}, \ldots, \overleftarrow{h_i^1}]$. A concatenation of the last hidden state of the forward pass and the first hidden state of the backward pass of the sequence-to-sequence encoder 560, $\varphi(x_i)=[\overrightarrow{h_i^n}; \overleftarrow{h_i^1}]$ (the hidden states 672A, 670C), can be used as the final representation for the embeddings 556 provided to the output program 562.

The output program 562 can include three output programs: decoder 567, task classifier 565, and corpus classifier 563. The decoder 577 can include an NN (e.g., an RNN) which, given the learned representation for the input sequence (output of the encoder 560), attempts to generate the input sequence 549. A goal of the decoder 577 can be to estimate a probability $P(o_i|x_i)=P(o_i^1, \ldots, o_i^m|x_i^1, \ldots, x_i^n)$ where $o_i^t$ is the output 579 of the decoder 577 at time step t. The decoding, by the decoder 577, can start by reading a special symbol (e.g., 'GO') at the first time step. Decoding can stop by reading, by the decoder 577, another special symbol (e.g., 'EOS') at the end of each input sentence 549. Given the outputs at each time step, the output 579 can be determined as:

$$P(o_i|x_i)=\Pi_{t=1}^{n} P(o_i^t|\varphi(x_i, o_i^1, \ldots, o_i^{t-1})).$$

The decoder 577 can be trained in an end-to-end training process. The training process can be performed using batches of samples $B=(x_i, y_i, d_i)$, where $y_i$ and $d_i$ are task label and domain label of a sample $x_i$, respectively. The conditional log-likelihood of a correct output $o_i$ can be determined given the input sequence $x_i$:

$$L_R(x_i) = -1/N \sum_{i=1}^{|B|} \log(o_i | x_i)$$

where N is the number of training samples.

The task classifier 565 can include a teed-forward NN layer with a non-linearity 573 (e.g., a hyperbolic tangent (tanh)) followed by a sigmoid 575. The task classifier 565 receives the learned representation for the input sequence from the sample representation program 558 (a concatenation of the hidden states 672A and 670C) and predicts the probability of the sample 549 constituting a task:

$$O_C = \tan h(W^{(C)}\varphi(x_i)+b^{(C)}) \in \mathbb{R}^{d_C}$$

$$\hat{y}_t = \text{sigmoid}(w^T O_C) \in \mathbb{R}$$

Where $W^{(C)} \in \mathbb{R}^{d_C \times d_1}$ and $b^{(C)} \in \mathbb{R}^{d_C}$ are a trainable projection matrix and bias respectively, and $d_C$ is the size of projection, and $w \in \mathbb{R}^{d_C}$ is a trainable vector.

The task classifier 565 can be trained in an end-to-end training process in which data $(x_i, y_i, d_i)$ is provided and $\hat{y}$ is predicted. The classification loss function 583 can calculate the loss using the cross-entropy loss, or other loss. Entropy loss can be determined as:

$$L_C = -y_i \log \hat{y}_t - (1-y_i)\log(1-\hat{y}_i)$$

Similar to the task classifier 565, the corpus classifier 563 can include at least one feed-forward layer with a non-linear NN 569. The non-linear NN 569 can be followed by a sigmoid layer 571. The sigmoid layer 571 can provide the output of the corpus classifier 563. The corpus classifier 563 can predict the probability of the sample 549 originating from the target corpus 204:

$$O_D = \tan h(W^{(D)}\varphi(x_i)+b^{(D)}) \in \mathbb{R}^{d_D}$$

$$\hat{y}_t = \text{sigmoid}(w^T O_D) \in \mathbb{R}$$

Where $W^{(D)} \in \mathbb{R}^{d_D \times d_1}$ and $b^{(D)} \in \mathbb{R}^{d_D}$ are a trainable projection matrix and bias respectively, and $d_D$ is the size of projection, and $w \in \mathbb{R}^{d_D}$ is a trainable vector.

The task classifier 565 can be trained in an end-to-end training process similar to the corpus classifier 563. Data $(x_i, y_i, d_i)$ can be provided and $\hat{y}$ can be predicted. The classifier loss function 583 can calculate the loss using the cross-entropy loss, or other loss. Entropy loss can be determined as:

$$L_D = -d_i \log \hat{y}_t - (1-d_i)\log(1-\hat{y}_t)$$

A goal of the training process can be to maximize the loss of the corpus classifier 563, such as to avoid capturing domain-specific information during learning sentence representation. Given the described loss functions 581, 583, and 585, the final objective function, determined by a loss program 587 of the autoencoder program 406 can be:

$$L = \alpha L_R + \beta L_C + \gamma L_D$$

The task 211, 311, 411 is any sentence in the corpus 202, 204 that includes a promise to perform an action or a request to perform an action which can potentially be acted upon by the PIM 212 (e.g., sending a document, sending an email, creating a meeting event, creating an appointment, adding a task to a task list, or the like) or be worthy of a reminder (e.g., meeting a colleague). The task detection of embodiments can be modeled as a binary classification task. The input, such as the source sample 203 or the target sample 205, in the task detection task can include a sentence and the output can include a binary label indicating whether that sentence constitutes a task between entities.

Assume that there is a set of sentences $X = \{x_0, x_1, \ldots, x_N\}$ extracted from the source corpus 202 and their associated task labels $Y = \{y_0, y_1, \ldots, y_N\}$, where $x_i$ is a sentence and $y_i$ is the binary task label for $x_i$ assigned by annotators. X and Y can be used to train the model program 210, 310, 410 and then use the model program 210, 310, 410 to predict a label for the task 211, 311, 411 for new sentences, such as the target sample 205. Different representations can be used to represent the source sample 203 in X:1) bag of word n-grams: for feature based models (such as logistic regression (LR)) word n-grams (e.g., n>1) can be used and the sample 203, 205 can be represented by the frequency of word n-grams therein; 2) bag of part-of-speech (POS) n-grams: similar to the previous representation but with bag of POS-tagged word n-grams (e.g., n>1) in the sample 203, 205 instead of bag of word n-grams. Statistical Parsing and Linguistic Analysis Toolkit (SPLAT) is a program from Microsoft Corporation of Redmond, Wash., United States, that can be used to extract POS tags. 3) sequence of words: for sequence based models (such as autoencoders), the sample 203, 205 can be represented as a sequence of words.

Figure 7:
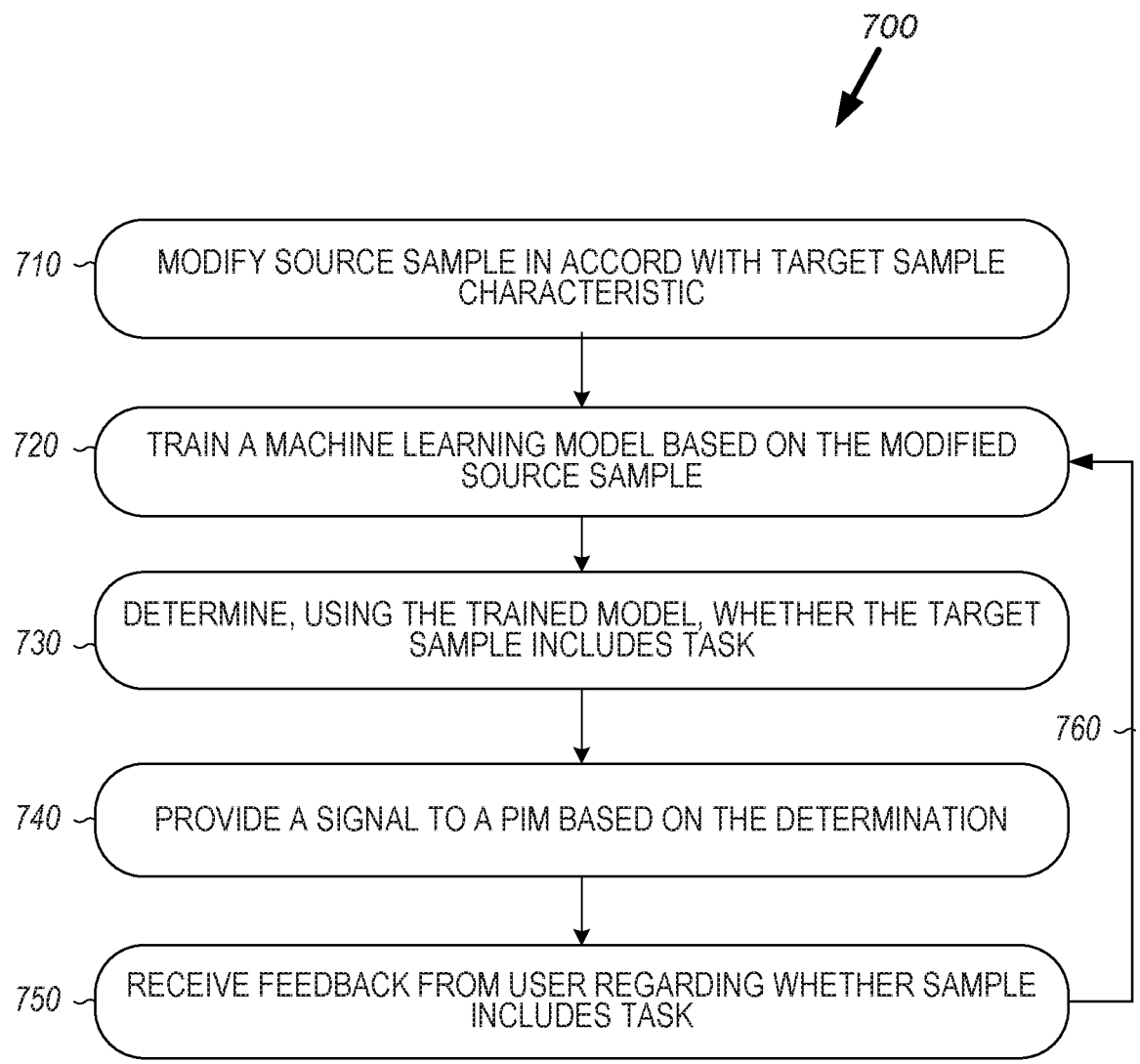
FIG. 7 illustrates, by way of example, a diagram of an embodiment of a method for task classification.

FIG. 7 illustrates, by way of example, a diagram of an embodiment of a method 700 for task detection in a sample from a target corpus based on samples from a source corpus. The method 700 as illustrated includes modifying a source sample in accord with a target sample characteristic, at operation 710; training a machine learning model based on the modified source sample, at operation 720; determining, using the trained model, whether the target sample includes a task, at operation 730; providing a signal to a PIM based on the determination at operation 730, at operation 740; receiving feedback from a user regarding whether the sample includes the task, at operation 750; and providing feedback data to further train the machine learning model, at operation 760. The source sample and the target sample can be respective sentences. The method 700 can further include causing the PIM to generate, based on whether the target sample includes the task: (i) a calendar event, (ii) a reminder, or (iii) an email.

The operation 710 can include performing feature adaptation to change features of the source samples to one or more specified values. Feature adaptation can include training a corpus classifier machine learning model to discriminate between the source samples and the target samples. Feature adaptation can include selecting top K features from the corpus classifier machine learning model. Feature adaptation can include replacing each of the top K features in the target samples with the specified value.

Feature adaptation can include identifying a mapping between features of the source sample and features of the target samples based on a distance between words of the source sample and respective mapped vectors. Feature adaptation can include replacing the representation of the word of the source sample with a mapped vector of the respective mapped vectors.

The operation 710 can include performing importance sampling to change weights of the source samples to importance weights. The importance weights can be determined based on a probability of a marginal distribution of a sample classified as being from the source corpus and a probability of a marginal distribution of the sample classified as being from the target corpus.

The machine learning model can include an NN autoencoder. The operation 710 can include adversarial training the NN autoencoder to increase a corpus classification loss while reducing a task classification loss and a sample reconstruction loss. The NN autoencoder can include a sample representation NN that: implements a sequence-to-sequence encoder that reads an embedded representation of the target sample in a first direction, creates a first sequence of hidden states, reads the embedded representation of the target sample in a second direction, opposite the first direction, and creates a second sequence of hidden states. The sample representation NN can provide a concatenation of a last hidden state of reading the embedded representation in the first direction and a first hidden state from reading the embedded representation in the second direction. The sample representation NN can include a recurrent NN (RNN).

Figure 8:
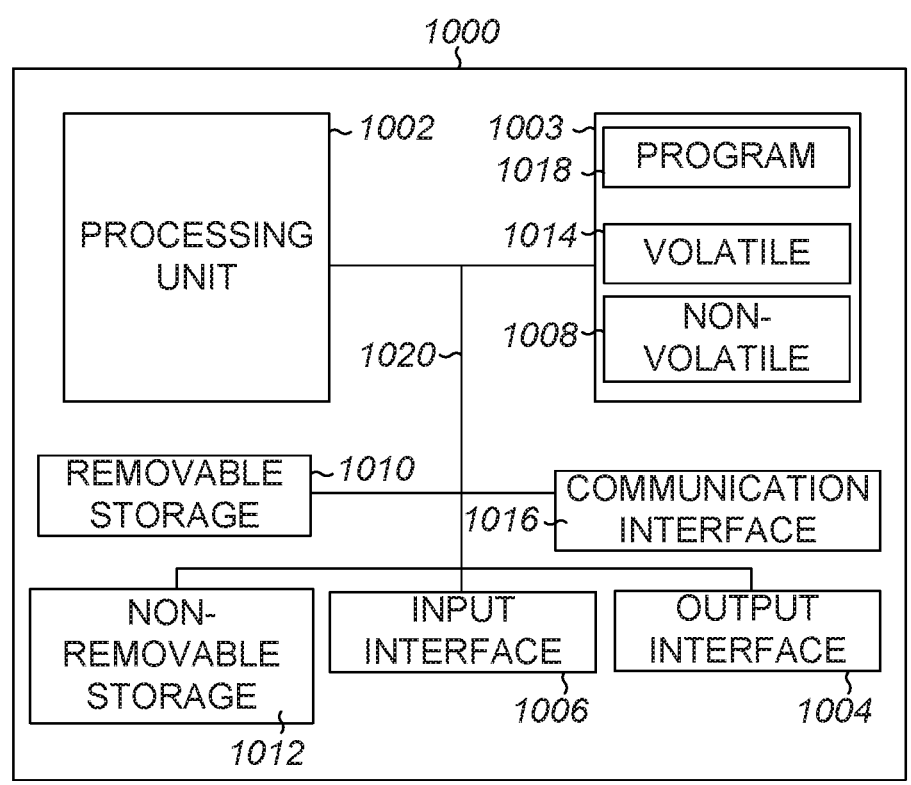
FIG. 8 illustrates, by way of example, a block diagram of an embodiment of a machine (e.g., a computer system) to implement one or more embodiments.

FIG. 8 illustrates, by way of example, a block diagram of an embodiment of a machine 1000 (e.g., a computer system) to implement one or more embodiments. One example machine 1000 (in the form of a computer), may include a processing unit 1002, memory 1003, removable storage 1010, and non-removable storage 1012. Although the example computing device is illustrated and described as machine 1000, the computing device may be in different forms in different embodiments. For example, the computing device may instead be a smartphone, a tablet, smartwatch, or other computing device including the same or similar elements as illustrated and described regarding FIG. 10. Devices such as smartphones, tablets, and smartwatches are generally collectively referred to as mobile devices. Further, although the various data storage elements are illustrated as part of the machine 1000, the storage may also or alternatively include cloud-based storage accessible via a network, such as the Internet.

Memory 1003 may include volatile memory 1014 and non-volatile memory 1008. The machine 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 1000, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 1000. A hard drive, CD-ROM, and RAM are some examples of articles including a non-transitory computer-readable medium such as a storage device. For example, a computer program 1018 may be used to cause processing unit 1002 to perform one or more methods or algorithms described herein.

Additional Notes and Examples:

Example 1 includes a system comprising a memory, processing circuitry coupled to the memory to implement operations for task classification on a target sample from a target corpus, the task classification including modifying a representation of a source sentence of a source sample from a source corpus to more closely resemble target sentences of target samples from a target corpus, operating, using a machine learning model trained using the modified representation of the source sentence, with the target sample to generate a task label, the task label indicating whether the target sample includes a task, and causing a personal information manager (PIM) to generate a reminder, based on whether the target sample includes the task.

In Example 2, Example 1 can further include, wherein modifying the representation of the source sentence of the source sample includes performing feature adaptation to change features of the source samples to one or more specified values.

In Example 3, Example 2 can further include, wherein the feature adaptation includes training a corpus classifier machine learning model to discriminate between the source samples and the target samples, selecting top K features from the corpus classifier machine learning model, and replacing each of the top K features in the target samples with the specified value.

In Example 4, at least one of Examples 2-3 can further include, wherein modifying the representation of the source sentence of the source sample includes identifying a mapping between features of the source sample and features of the target samples based on a distance between words of the source sample and respective mapped target words of the target samples, and replacing a vector representation of a respective word of the source sample with a mapped vector of the respective mapped target word.

In Example 5, at least one of Examples 1-4 can further include, wherein modifying the representation of the source sentence of the source sample includes performing importance sampling to change weights of the source samples to importance weights.

In Example 6, Example 5 can further include, wherein the importance weights are determined based on a probability of a marginal distribution of a sample classified as being from the source corpus and a probability of a marginal distribution of the sample classified as being from the target corpus.

In Example 7, at least one of Examples 1-6 can further include, wherein the machine learning model includes a neural network (NN) autoencoder and wherein the operations further comprise modifying a representation of a source sentence of a source sample from a source corpus to include a representation of target sentences of the target samples from the target corpus includes adversarial training the NN to increase a corpus classification loss while reducing a task classification loss and a sample reconstruction loss.

In Example 8, Example 7 can further include, wherein the NN autoencoder includes a sample representation NN that:

implements a sequence-to-sequence encoder that reads an embedded representation of the target sample in a first direction, creates a first sequence of hidden states, reads the embedded representation of the target sample in a second direction, opposite the first direction, and creates a second sequence of hidden states.

In Example 9, Example 8 can further include, wherein the sample representation NN provides a concatenation of a last hidden state of reading the embedded representation in the first direction and a first hidden state from reading the embedded representation in the second direction.

In Example 10, at least one of Examples 1-9 can further include, wherein the task classification further includes training the machine learning model using the modified representation of the source sentence.

In Example 11, Example 10 can further include, wherein the task classification further includes receiving feedback data from the PIM and further training the model based on the feedback data, wherein the feedback data indicates whether the target sample includes the task based on a user input to an interface of the PIM.

In Example 12, at least one of Examples 1-11 can further include, wherein the reminder includes (i) an apppointment, (ii) a meeting, (iii) a notification, (iv) a text message, (v) an email, or (vi) an instant message.

Example 13 can include at least one machine-readable storage medium including instructions for execution by processing circuitry to perform operations for task detection, the operations comprising modifying a representation of a source sentence of a source sample from a source corpus to more closely resemble a representation of target sentences of target samples from a target corpus, operating, using a machine learning model trained using the modified representation of the source sentence, with the target sample to generate a task label, the task label indicating whether the target sample includes a task, and causing a personal information manager (PIM) to generate a reminder, based on whether the target sample includes the task.

In Example 14, Example 13 can further include, wherein modifying the representation of the source sentence of the source sample includes performing feature adaptation to change features of the source samples to one or more specified values, importance sampling to change weights of the source samples to importance weights, or using a neural network (NN) autoencoder adversarial trained to increase a corpus classification loss while reducing a task classification loss and a sample reconstruction loss.

In Example 15, Example 14 can further include, wherein the feature adaptation includes training a corpus classifier machine learning model to discriminate between the source samples and the target samples, selecting top K features from the corpus classifier machine learning model, and replacing each of the top K features in the target samples with the specified value.

In Example 16, at least one of Examples 14-15 further includes, wherein modifying the representation of the source sentence of the source sample includes identifying a mapping between features of the source sample and features of the target samples based on a distance between words of the source sample and respective mapped vectors, and replacing the representation of the word of the source sample with a mapped vector of the respective mapped vectors.

In Example 17, at least one of Examples 14-16 further includes, wherein the importance weights are determined based on a probability of a marginal distribution of a sample classified as being from the source corpus and a probability of a marginal distribution of the sample classified as being from the target corpus.

In Example 18, at least one of Examples 13-17 can further include, wherein the machine learning model includes a neural network (NN) autoencoder and wherein the operations further comprise modifying a representation of a source sentence of a source sample from a source corpus to include a representation of target sentences of the target samples from the target corpus includes adversarial training the NN to increase a corpus classification loss while reducing a task classification loss and a sample reconstruction loss.

In Example 19, Example 18 can further include, wherein the NN autoencoder includes a sample representation NN that: implements a sequence-to-sequence encoder that reads an embedded representation of the target sample in a first direction, creates a first sequence of hidden states, reads the embedded representation of the target sample in a second direction, opposite the first direction, and creates a second sequence of hidden states.

In Example 20, Example 19 can further include, wherein the sample representation NN provides a concatenation of a last hidden state of reading the embedded representation in the first direction and a first hidden state from reading the embedded representation in the second direction.

In Example 21, at least one of Examples 13-20 can further include, wherein the task classification further includes training the machine learning model using the modified representation of the source sentence.

In Example 22, Example 21 can further include, wherein the task classification further includes receiving feedback data from the PIM and further training the model based on the feedback data, wherein the feedback data indicates whether the target sample includes the task based on a user input to an interface of the PIM.

In Example 23, at least one of Examples 13-22 can further include, wherein the reminder includes (i) an apppointment, (ii) a meeting, (iii) a notification, (iv) a text message, (v) an email, or (vi) an instant message.

Example 24 includes a method, performed by at least one processor of a computing system, the method comprising modifying a representation of a source sentence of a source sample from a source corpus to more closely resemble a representation of target sentences of target samples from a target corpus, operating, using a machine learning model trained using the modified representation of the source sentence, with the target sample to generate a task label, the task label indicating whether the target sample includes a task, and causing a personal information manager (PIM) to generate a reminder, based on whether the target sample includes the task.

In Example 25, Example 24 can further include, wherein modifying the representation of the source sentence of the source sample includes performing feature adaptation to change features of the source samples to one or more specified values, importance sampling to change weights of the source samples to importance weights, or using a neural network (NN) autoencoder adversarial trained to increase a corpus classification loss while reducing a task classification loss and a sample reconstruction loss.

In Example 26, Example 25 can further include, wherein the feature adaptation includes training a corpus classifier machine learning model to discriminate between the source samples and the target samples, selecting top K features from the corpus classifier machine learning model, and replacing each of the top K features in the target samples with the specified value.

In Example 27, at least one of Examples 25-26 further includes, wherein modifying the representation of the source sentence of the source sample includes identifying a mapping between features of the source sample and features of the target samples based on a distance between words of the source sample and respective mapped vectors, and replacing the representation of the word of the source sample with a mapped vector of the respective mapped vectors.

In Example 28, at least one of Examples 25-27 further includes, wherein the importance weights are determined based on a probability of a marginal distribution of a sample classified as being from the source corpus and a probability of a marginal distribution of the sample classified as being from the target corpus.

In Example 29, at least one of Examples 24-28 can further include, wherein the machine learning model includes a neural network (NN) autoencoder and wherein the operations further comprise modifying a representation of a source sentence of a source sample from a source corpus to include a representation of target sentences of the target samples from the target corpus includes adversarial training the NN to increase a corpus classification loss while reducing a task classification loss and a sample reconstruction loss.

In Example 30, Example 29 can further include, wherein the NN autoencoder includes a sample representation NN that: implements a sequence-to-sequence encoder that reads an embedded representation of the target sample in a first direction, creates a first sequence of hidden states, reads the embedded representation of the target sample in a second direction, opposite the first direction, and creates a second sequence of hidden states.

In Example 31, Example 30 can further include, wherein the sample representation NN provides a concatenation of a last hidden state of reading the embedded representation in the first direction and a first hidden state from reading the embedded representation in the second direction.

In Example 32, at least one of Examples 24-31 can further include, wherein the task classification further includes training the machine learning model using the modified representation of the source sentence.

In Example 33, Example 32 can further include, wherein the task classification further includes receiving feedback data from the PIM and further training the model based on the feedback data, wherein the feedback data indicates whether the target sample includes the task based on a user input to an interface of the PIM.

In Example 34, at least one of Examples 24-33 can further include, wherein the reminder includes (i) an apppointment, (ii) a meeting, (iii) a notification, (iv) a text message, (v) an email, or (vi) an instant message.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:
1. A system comprising:
a memory;
processing circuitry coupled to the memory to implement operations for task classification on a target sample from a target corpus of target samples including a first lexicon and context, the task classification including:
modifying a representation of a source sentence of a source sample from a source corpus of source samples including a second lexicon and context different from the first lexicon and context to more closely resemble target sentences of the target samples from the target corpus;
operating, using a machine learning model trained using the modified representation of the source sentence, with the target sample as input to the machine learning model to generate a task label, the task label indicating whether the target sample includes a task; and
causing a personal information manager (PIM) to generate a notification reminder, based on the task in the target sample.

2. The system of claim 1, wherein modifying the representation of the source sentence of the source sample includes performing feature adaptation to change features of the source samples to one or more specified values.

3. The system of claim 2, wherein the feature adaptation includes:
training a corpus classifier machine learning model to discriminate between the source samples and the target samples;
selecting top K features from the corpus classifier machine learning model; and
replacing each of the top K features in the target samples with the specified value.

4. The system of claim 2, wherein modifying the representation of the source sentence of the source sample includes:
identifying a mapping between features of the source sample and features of the target samples based on a distance between words of the source sample and respective mapped target words of the target samples; and
replacing a vector representation of a respective word of the source sample with a mapped vector of the respective mapped target word.

5. The system of claim 1, wherein modifying the representation of the source sentence of the source sample includes performing importance sampling to change weights of the source samples to importance weights.

6. The system of claim 5, wherein the importance weights are determined based on a probability of a marginal distribution of a sample classified as being from the source corpus and a probability of a marginal distribution of the sample classified as being from the target corpus.

7. The system of claim 1, wherein the machine learning model includes a neural network (NN) autoencoder and wherein the operations further comprise modifying a representation of a source sentence of a source sample from a source corpus to include a representation of target sentences of the target samples from the target corpus includes adversarial training the NN to increase a corpus classification loss while reducing a task classification loss and a sample reconstruction loss.

8. The system of claim 7, wherein the NN autoencoder includes a sample representation NN that: implements a sequence-to-sequence encoder that reads an embedded representation of the target sample in a first direction, creates a first sequence of hidden states, reads the embedded representation of the target sample in a second direction, opposite the first direction, and creates a second sequence of hidden states.

9. The system of claim 8; wherein the sample representation NN provides a concatenation of a last hidden state of reading the embedded representation in the first direction and a first hidden state from reading the embedded representation in the second direction.

10. The system of claim 1, wherein the task classification further includes training the machine learning model using the modified representation of the source sentence.

11. The system of claim 10, wherein the task classification further includes receiving feedback data from the PIM and further training the model based on the feedback data, wherein the feedback data indicates whether the target sample includes the task based on a user input to an interface of the PIM.

12. The system of claim 1, wherein the reminder further includes (i) an apppointment, (ii) a meeting, (iii) a text message, (iv) an email, or (v) an instant message.

13. At least one machine-readable storage medium including instructions for execution by processing circuitry to perform operations for task detection in a target sample from a target corpus of target samples including a first lexicon and context, the operations comprising:
modifying a representation of a source sentence of a source sample from a source corpus of source samples including a second lexicon and context different from the first lexicon and context to more closely resemble a representation of target sentences of the target samples from the target corpus;
operating, using a machine learning model trained using the modified representation of the source sentence; with the target sample as input the machine learning model to generate a task label, the task label indicating whether the target sample includes a task; and
causing a personal information manager (PIM) to generate a notification reminder, based on task in the target.

14. The at least one machine-readable storage medium of claim 13, wherein modifying the representation of the source sentence of the source sample includes performing feature adaptation to change features of the source samples to one or more specified values, importance sampling to change weights of the source samples to importance weights, or using a neural network (NN) autoencoder adversarial trained to increase a corpus classification loss while reducing a task classification loss and a sample reconstruction loss.

15. The at least one machine-readable storage medium of claim 14, wherein the feature adaptation includes:
training a corpus classifier machine learning model to discriminate between the source samples and the target samples;
selecting top K features from the corpus classifier machine learning model; and
replacing each of the top K features in the target samples with the specified value.

16. The at least one machine-readable storage medium of claim 14, wherein modifying the representation of the source sentence of the source sample includes:
identifying a mapping between features of the source sample and features of the target samples based on a distance between words of the source sample and respective mapped vectors; and
replacing the representation of the word of the source sample with a mapped vector of the respective mapped vectors.

17. The at least one machine-readable storage medium of claim 14, wherein the importance weights are determined based on a probability of a marginal distribution of a sample classified as being from the source corpus and a probability of a marginal distribution of the sample classified as being from the target corpus.

18. A method, performed by at least one processor of a computing system, for task classification on a target sample from a target corpus of target samples of target samples including a first lexicon and context, the method comprising:
modifying a representation of a source sentence of a source sample from a source corpus of source samples including a second lexicon and context different from the first lexicon and context to more closely resemble a representation of target sentences of the target samples from the target corpus;
operating, using a machine learning model trained using the modified representation of the source sentence, with the target sample as input to the machine learning model to generate a task label, the task label indicating whether the target sample includes a task; and
causing a personal information manager (PIM) to generate a notification reminder, based on the task in the target sample.

19. The method of claim 18, wherein the task classification further includes training the machine learning model using the modified representation of the source sentence.

20. The method of claim 19, further comprising receiving feedback data from the PIM and further training the model based on the feedback data, wherein the feedback data indicates whether the target sample includes the task based on a user input to an interface of the PIM.

* * * * *